April 21, 1964 S. S. KAHN 3,129,444
METHODS OF PRODUCING STRONG THREADED ANCHORAGES IN
WORKPIECES AND FERRULES FOR USE IN SUCH METHODS
Filed April 2, 1962
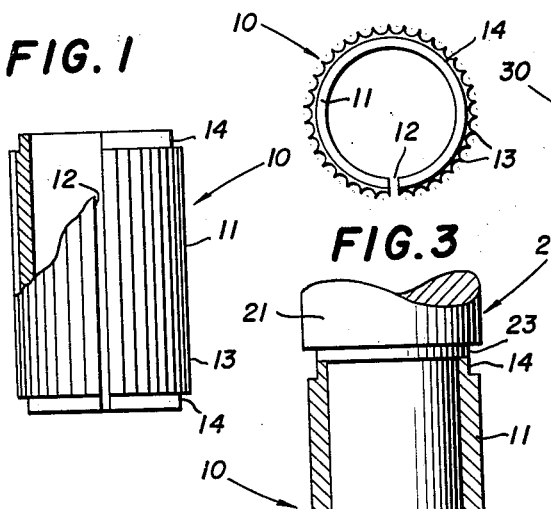
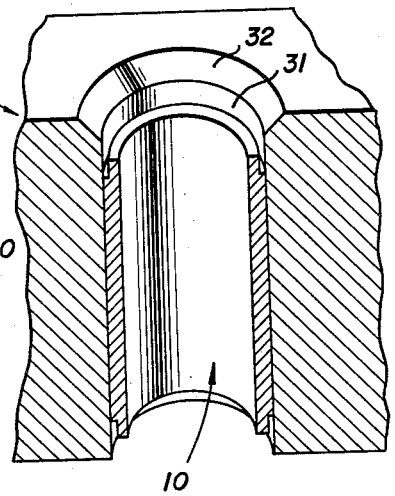
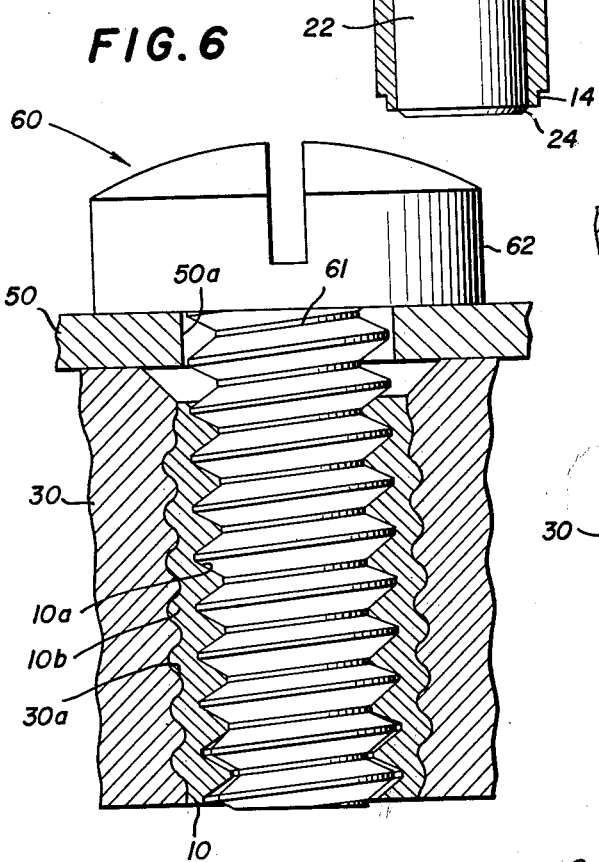
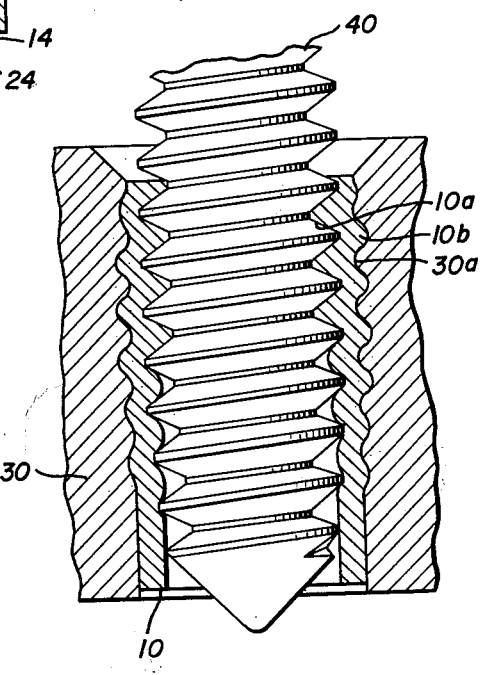
INVENTOR.
SIMON S. KAHN
BY
Pringley, Baird, Clayton,
Miller & Vogel,
ATTYS.

3,129,444
METHODS OF PRODUCING STRONG THREADED ANCHORAGES IN WORKPIECES AND FERRULES FOR USE IN SUCH METHODS
Simon S. Kahn, Glen Ridge, N.J., assignor to General American Transportation Corporation, Chicago, Ill., a corporation of New York
Filed Apr. 2, 1962, Ser. No. 184,320
5 Claims. (Cl. 10—86)

The present invention relates to methods of producing strong threaded anchorages in workpieces and to ferrules for use in such methods.

In the copending application of Simon S. Kahn, Serial No. 98,116, filed March 24, 1961, there are disclosed a strong threaded anchorage in a workpiece and a method of making the same that involve the use of a substantially cylindrical ferrule, wherein the workpiece is formed of a relatively soft metal, such as aluminum, the ferrule is formed of a relatively hard metal, such as low carbon steel. In accordance with this method, a substantially cylindrical bore is provided in the workpiece and the ferrule is inserted into the bore and into frictional engagement with the wall thereof so as firmly to secure the ferrule in place. Then the interior surface of the ferrule is subjected to swaging pressure with an extremely hard thread-swaging member so as simultaneously to swage an internal thread upon the interior surface of the ferrule and to swage an external thread-like structure upon the exterior surface of the ferrule and to compress an internal thread-like structure upon the workpiece interiorly of the bore, wherein the two thread-like structures mentioned are complementary and the external thread-like structure is swaged into interlocked frictional engagement with the internal thread-like structure so as securely to anchor the ferrule in place in the bore, wherein the internal thread and the two thread-like structures are in phase with each other, and wherein the internal thread is adapted to receive and to engage a cooperating external thread carried upon the shank of a screw, or the like.

It is a general object of the present invention to provide an improved method of the character described and including the utilization of a ferrule of improved construction and arrangement.

Another object of the invention is to provide a ferrule of improved construction and arrangement that is especially designed for use in carrying out the improved method of the character described.

Further features of the invention pertain to the particular arrangement of the steps of the method of producing a strong threaded anchorage in the workpiece and to the arrangement of the elements of the ferrule for use in carrying out the method, whereby the above outlined and additional operating features thereof are attained.

The invention, both as to its organization and method of operation, together with further objects and advantages thereof, will best be understood by reference to the following specification, taken in connection with the accompanying drawing, in which:

FIGURE 1 is a fragmentary side elevational view of a ferrule embodying the present invention and that is employed in carrying out the method of the present invention;

FIG. 2 is a top view of the ferrule;

FIG. 3 is a longitudinal sectional view of the ferrule and a fragmentary side elevational view of a cooperating mandrel that is employed in driving the same in an initial step of the method;

FIG. 4 is a perspective view of a longitudinal section taken through a workpiece with the ferrule in its driven position into a bore provided in the workpiece;

FIG. 5 is an enlarged longitudinal sectional view of the workpiece and the ferrule and a fragmentary side elevational view of a cooperating thread-swaging tool that is employed in swaging an internal thread in the ferrule in a subsequent step of the method; and FIG. 6 is another enlarged longitudinal sectional view of the workpiece and the ferrule, and a side elevational view of a cooperating screw, and further illustrating a member secured to the workpiece by the screw mentioned.

Referring now to FIGS. 1 to 4, inclusive, of the drawings, the ferrule 10 there illustrated, and embodying the features of the present invention, is employed in the method of the present invention in producing a strong threaded anchorage in an associated workpiece; and more particularly, the ferrule 10 is adapted to be driven into frictional engagement with the wall of a bore provided in the associated workpiece. The ferrule 10 comprises an elongated longitudinally extending substantially cylindrical body or side wall 11 having an elongated longitudinally extending slot 12 formed therein. The external surface of the side wall 11 carries a plurality of circumferentially spaced-apart and longitudinally extending serrations 13 therein that are embedded into the wall of the bore in the associated workpiece incident to the driving of the ferrule 10 into frictional engagement therewith; and the opposite ends of the ferrule 10 are chamfered, as illustrated at 14, in order to facilitate the insertion of the front end of the ferrule 10 into the outer end of the cooperating bore provided in the associated workpiece, and regardless of the end of the ferrule that is presented to the outer end of the cooperating bore. The ferrule 10 may be formed of a relatively hard sheet metal that is characterized by plastic flow under swaging pressure internally thereof, such, for example, as the low carbon steel SAE 1010. The dimensions of the ferrule 10 are selected, depending upon the character of the workpiece, the dimensions of the screw or other threaded fastener that is to be received within the internal thread that is subsequently provided in the ferrule 10 in the final strong threaded anchorage that is produced in the associated workpiece, etc. However, ordinarily the ferrule 10 has a length that is greater than the external diameter of the side wall 11 thereof and is formed of sheet metal of relatively thin gauge.

After the ferrule 10 is formed of the relatively hard sheet metal, as previously noted, the outer casing or skin thereof is treated to effect hardening thereof with respect to the core or interior body thereof. The hardening mentioned may be effected in any conventional manner, such, for example, as by case-hardening, which involves a heat-treatment of the ferrule 10 with the outer surface thereof in contact with a nitridizing agent, such as potassium ferrocyanide. This construction of the ferrule 10 comprising the outer casing that is prehardened with respect to the core thereof is very advantageous, since the outer casing being harder than the core minimizes longitudinal creep of the ferrule 10 in the bore of the associated workpiece incident to subjecting of the ferrule 10 to swaging pressure internally thereof in the present method, as explained more fully subsequently.

After the outer casing or surface of the ferrule 10 is hardened, it is provided with a coating of cadmium; which surface coating of cadmium may be applied thereto in any conventional manner, such, for example, as by electroplating. This construction of the ferrule comprising the surface coating of cadmium carried by the outer prehardened casing thereof is very advantageous, since this surface coating effectively lubricates the thread-swaging member or tool that is employed to subject the ferrule to swaging pressure internally thereof in the present method.

Referring now more particularly to FIG. 3, the ferrule 10 may be conveniently forced or driven into frictional engagement with the wall of the bore provided in the associated workpiece utilizing the mandrel 20, which may be conveniently formed of steel, or the like. More particularly, the mandrel 20 comprises an elongated forwardly projecting substantially cylindrical shank 21, and the front end of the shank 21 terminates in an elongated forwardly projecting substantially cylindrical arbor 22. Also, a short annular shoulder or collar 23 is arranged at the junction between the front end of the shank 21 and the rear end of the arbor 22. In the arrangement, the arbor 22 has an external diameter substantially equal to the internal diameter of the ferrule 10, the collar 23 has an external diameter somewhat larger than that of the arbor 22 and substantially equal to the external diameter of the side wall 11 of the ferrule 10 at the chamfers 14 provided in the ends thereof, and the shank 21 has an external diameter that is somewhat larger than that of the collar 23 and somewhat larger than the external diameter of the side wall 11 of the ferrule 10. Finally, the extreme front end of the arbor 22 carries a bevel, indicated at 24, that facilitates insertion of the ferrule 10 into the bore provided in the associated workpiece. In the arrangement, the arbor 22 has a length between the front face of the collar 23 and the base of the bevel 24 that is substantially the same as that of the ferrule 10 between the opposite ends thereof.

In utilizing the mandrel 20, the ferrule 10 is first fitted over the arbor 22, so that the rear end of the ferrule 10 engages the front face or anvil of the collar 23 and the front end of the ferrule 10 terminates at the base of the bevel 24, whereby the extreme front end of the arbor 22 projects slightly forwardly of the front end of the ferrule 10, as clearly shown in FIG. 3. When the ferrule 10 occupies its mounted position upon the arbor 22, as shown in FIG. 3, the ferrule is frictionally retained in place due to the previously described fit between the exterior surface of the arbor 22 and the interior surface of the ferrule 10, and since the slot 12 provided in the side wall 11 of the ferrule 10 accommodates slight expansion of the ferrule 10 upon the arbor 22.

Referring now to FIG. 4, the workpiece 30 into which the ferrule 10 is to be inserted is normally formed of a suitable relatively soft compressible solid material, such, for example, as the aluminum alloys in the series: 2–S, 25S, 52–S and 61–S. A substantially cylindrical bore 31 is provided through the workpiece 30 that has an internal diameter so that the ferrule 10 will be frictionally received therein, so that the serrations 13 provided in the exterior surface of the side wall 11 of the ferrule 10 will be embedded in the wall of the bore 31 incident to the driving of the ferrule 10, and so that the slot 12 provided in the side wall 11 of the ferrule 10 will be substantially closed incident to the driving of the ferrule 10. Also, a chamfer or bevel 32 is provided in the workpiece 30 in surrounding relation with the outer end of the bore 31, so as to facilitate the insertion of the extreme front end of the arbor 22 of the mandrel 20.

Further considering the present method, after the ferrule 10 is mounted upon the arbor 22 of the mandrel 20, the extreme front end of the arbor 22 is inserted in the outer end of the bore 31 with the chamfer 14 provided in the front end of the ferrule 10 positioned within the outer end of the bore 31 and below the bevel 32. The axis of the mandrel 20 is aligned with the axis of the bore 31, and then the mandrel 20 is moved axially toward the workpiece by the exertion of gradual pressure thereupon, by striking the mandrel 20 a hammer blow, etc. As the mandrel 20 is thus moved toward the workpiece 30, the ferrule 10 is forced or driven into the bore 31, whereby the serrations 13 provided in the side wall 11 of the ferrule 10 are embedded in the wall of the bore 31, as indicated in FIG. 4. During the driving of the ferrule 10, the interior surface thereof is in engagement with the exterior surface of the arbor 22 and the front face or anvil of the collar 23 is in engagement with the rear end of the ferrule 10, whereby the side wall 11 of the ferrule 10 is completely supported in the driving step. At the conclusion of the driving step, the extreme front end of the shank 21 engages the workpiece 30 within the bevel 32, whereby the short collar 23 is disposed within the outer end of the bore 31, thereby to insure that the rear end of the ferrule 10 is set slightly below the outer end of the bore 31. Further, the ferrule 10 has a length from end to end thereof that is somewhat shorter than the thickness of the workpiece 30, so that when the ferrule 10 occupies its set position with respect to the workpiece 30 as shown in FIG. 4, the front end of the ferrule 10 is also set slightly below the adjacent inner end of the bore 31. Specifically, as illustrated in FIG. 4, the opposite ends of the ferrule 10 are set slightly below the adjacent opposite ends of the bore 31. This feature is automatically achieved by the utilization of the mandrel 20 in driving the ferrule 10 into the bore 31 provided in the workpiece 30 as a result of the provision of the short collar 23 on the mandrel 20 at the junction between the front end of the shank 21 and the rear end of the arbor 22. This arrangement is very advantageous as it prevents subsequent extension of the metal of the ferrule 10 from the ends of the bore 31 in the workpiece 30 incident to the carrying out of a subsequent swaging step in the present method, as described subsequently, thereby to prevent the formation of undesirable burrs upon the workpiece 30 adjacent to the opposite ends of the bore 31 therein.

Continuing with the present method, after the ferrule 10 has been driven in place in the bore 31 provided in the workpiece 30, the interior surface of the ferrule 10 is subjected to swaging pressure in the manner illustrated in FIG. 5 and utilizing an extremely hard thread-swaging member 40 that may be of the construction and arrangement of that disclosed in U.S. Reissue Patent No. 24,572, granted on December 2, 1958, to Donald P. Welles, Jr. More particularly, this thread-swaging member or tap 40 is inserted into the outer end of the ferrule 10 and then pressed home and rotated; whereby the interior surface of the ferrule 10 is subjected to swaging pressure so as simultaneously to swage an internal thread 10a upon the interior surface of the ferrule 10 and to swage an external thread-like structure 10b upon the exterior surface of the ferrule 10 and to compress an internal thread-like structure 30a upon the workpiece 30 interiorly of the bore 31; wherein the thread-like structures 10b and 30a are complementary and disposed in interlocked frictional engagement with each other so as securely to anchor the ferrule 10 in place in the bore 31 provided in the workpiece 30. Also, the thread 10a and the thread-like structures 10b and 30a are in phase with each other and of the same pitch so as to provide maximum strength in the anchorage thus formed. After threading of the interior of the ferrule 10, the tap is removed from engagement with the internal thread 10a; whereby the previously mentioned strong threaded anchorage is provided.

The utilization of the present ferrule 10 in the present method is very advantageous, since the surface coating of cadmium carried thereby effectively lubricates the tap 40 so as drastically to reduce the amount of torque that must be exerted in operating the tap 40 in the swaging step, and rendering it unnecessary to employ a separate lubricating compound or other agent in the swaging step. Of course, such automatic lubrication of the tap 40 by the surface coating of cadmium carried by the ferrule 10, minimizes the breakage of the taps 40 in the commercial production of the workpieces 30 and contributes materially to the overall economy of the present method.

Also, the utilization of the present ferrule 10 in the present method is advantageous from the standpoint of the production of finished workpieces 30 that require no subsequent operations to remove objectionable burrs from the anchorages thus produced. More particularly, the outer casing of the ferrule 10 being harder than the core thereof minimizes longitudinal creep or extrusion thereof in the swaging step, while accommodating the required lateral plastic flow of the metal of the ferrule 10 in forming the internal thread 10a and the external thread-like structure 10b. Moreover, the limited longitudinal creep or extrusion of the ferrule 10 that does take place in the swaging step is of predetermined character by virtue of this construction, whereby the same may be accurately controlled so as precisely to extrude the ferrule 10 longitudinally completely to fill the opposite ends of the bore 31, as clearly shown in FIG. 6, without protrusion therebeyond and the resulting formation of objectionable burrs upon the workpiece 30.

After the strong threaded anchorage is thus produced in the workpiece 30, the same is of general utility in securing other parts or elements to the workpiece 30 in the production of desired assemblies. For example, as illustrated in FIG. 6, an external plate 50 may be secured or fastened to the workpiece 30, utilizing a conventional machine screw 60, the machine screw 60 including a threaded shank 61 and being provided with an enlarged head 62 at the rear end thereof. In the arrangement, the plate 50 is disposed in contact with the adjacent surface of the workpiece 30 and is secured in place by the screw 60, the shank of the screw 60 passing through a cooperating opening 50a provided through the plate 50. Specifically, the threaded shank 61 engages the internal thread 10a carried upon the interior surface of the ferrule 10, and the head 62 engages the adjacent surface of the plate 50, thereby retaining the plate 50 in assembled relation with respect to the workpiece 30 and providing the secure connection therebetween.

While the present method has been described in conjunction with the workpiece 30 having the bore 31 extending entirely therethrough, it will be understood that the same is not limited to this special case and may be carried out in the same manner in conjunction with a workpiece having a bore extending only partially therethrough. In other words, a so-called "blind" or "closed-end" bore may be provided in the workpiece 30, and the ferrule 10 may be utilized in such bore in producing a strong threaded anchorage in this workpiece 30, in accordance with the present method. In fact, the last-mentioned construction is employed in retaining in place the head on an engine block formed of an aluminum alloy and provided with strong threaded anchorages produced in accordance with the present method.

In a constructional example of the ferrule 10 especially designed to receive a ¼" machine screw having twenty threads per inch, the length of the ferrule 10 between the opposite ends thereof is 0.427"+0.000"−0.010"; the internal diameter of the opening through the side wall is 0.225"±0.001"; the external diameter of the side wall 11 over the serrations 13 is within the limits 0.266" to 0.269"; the length of each chamfer 14 is 0.015"±0.003"; the external diameter of each chamfer 14 is within the limits 0.253" to 0.255"; and the slot 12 is produced in an initially continuous tube using a saw cutter having a width of 0.018". The material of the ferrule 10 is SAE 1010 steel; the outer surfaces are case-hardened; and the minimum acceptable cadmium plating has a thickness of 0.0002".

In view of the foregoing, it is apparent that there have been provided a ferrule of improved construction and arrangement that is especially adapted for use in the production of a strong threaded anchorage in an associated workpiece, and an improved method of producing the anchorage mentioned utilizing the ferrule noted.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. The method of producing a strong threaded anchorage in a workpiece formed of relatively soft metal, comprising providing a bore in said workpiece, providing a ferrule formed of relatively hard metal characterized by plastic flow under swaging pressure, wherein the outer casing of said ferrule has been prehardened with respect to the core thereof, securing said ferrule in place in said bore, and subjecting the interior surface of said ferrule to swaging pressure with an extremely hard thread-swaging member so as simultaneously to swage an internal thread upon the interior surface of said ferrule and to swage an external thread-like structure upon the exterior surface of said ferrule and to compress an internal thread-like structure upon said workpiece interiorly of said bore, wherein said thread-like structures are complementary and said external thread-like structure is swaged into interlocked frictional engagement with said internal thread-like structure so as securely to anchor said ferrule in place in said bore, and wherein the outer casing of said ferrule being harder than the core thereof minimizes longitudinal creep of said ferrule in said bore in said step of subjecting the interior surface of said ferrule to swaging pressure, said internal thread being adapted to receive and to engage a cooperating external thread carried upon the shank of a screw, or the like.

2. The method of producing a strong threaded anchorage in a workpiece formed of relatively soft metal, comprising providing a bore in said workpiece, providing a ferrule formed of relatively hard metal characterized by plastic flow under swaging pressure, wherein the outer casing of said ferrule has been prehardened with respect to the core thereof, and wherein said ferrule has a length that is somewhat less than that of said bore, securing said ferrule in place in said bore with the opposite ends of said ferrule spaced somewhat inwardly from the respectively adjacent opposite ends of said bore, and subjecting the interior surface of said ferrule to swaging pressure with an extremely hard thread-swaging member so as simultaneously to swage an internal thread upon the interior surface of said ferrule and to swage an external thread-like structure upon the exterior surface of said ferrule and to compress an internal thread-like structure upon said workpiece interiorly of said bore, wherein said thread-like structures are complementary and said external thread-like structure is swaged into interlocked frictional engagement with said internal thread-like structure so as securely to anchor said ferrule in place in said bore, and wherein the outer casing of said ferrule being harder than the core thereof minimizes longitudinal creep of said ferrule and prevents the opposite ends thereof from being extended outwardly beyond the respectively adjacent opposite ends of said bore in said step of subjecting the interior surface of said ferrule to swaging pressure, said internal thread being adapted to receive and to engage a cooperating external thread carried upon the shank of a screw, or the like.

3. The method of producing a strong threaded anchorage in a workpiece formed of relatively soft metal, comprising providing a bore in said workpiece, providing a ferrule formed of relatively hard metal characterized by plastic flow under swaging pressure, wherein the outer casing of said ferrule has been pre-hardened with respect to the core thereof, and wherein the outer casing of said ferrule carries a surface coating of cadmium, securing said ferrule in place in said bore, and subjecting the interior surface of said ferrule to swaging pressure with an extremely hard thread-swaging member so as simultaneously to swage an internal thread upon the interior surface of said ferrule and to swage an external thread-like structure upon the exterior surface of said ferrule and to compress an internal thread-like structure upon said workpiece interiorly of said bore, wherein said thread-like structures are complementary and said external thread-like structure is swaged into interlocked frictional engagement with said internal thread-like structure so as securely to anchor said ferrule in place in said bore, wherein the outer casing of said ferrule being harder than the core thereof minimizes longitudinal creep of said ferrule in said bore in said step of subjecting the interior surface of said ferrule to swaging pressure, and wherein said surface coating of cadmium carried by the outer casing of said ferrule effectively lubricates the thread-swaging member in said step of subjecting the interior surface of said ferrule to swaging pressure, said internal thread being adapted to receive and to engage a cooperating external thread carried upon the shank of a screw, or the like.

4. The method of producing a strong threaded anchorage in a workpiece formed of relatively soft metal, comprising providing a bore in said workpiece, providing a ferrule formed of relatively hard metal characterized by plastic flow under swaging pressure, wherein the outer casing of said ferrule has been prehardened with respect to the core thereof, and wherein said ferrule is split longitudinally and the exterior surface thereof carries a plurality of longitudinally extending serrations therein, forcing said ferrule into said bore so as to close the split in said ferrule and to cause said serrations to cut into the wall of said bore in order firmly to secure said ferrule in place in said bore, and subjecting the interior surface of said ferrule to swaging pressure with an extremely hard thread-swaging member so as simultaneously to expand said ferrule radially outwardly into firm engagement with the wall of said bore and to swage an internal thread upon the interior surface of said ferrule and to swage an external thread-like structure upon the exterior surface of said ferrule and to compress an internal thread-like structure upon said workpiece interiorly of said bore, wherein said thread-like structures are complementary and said external thread-like structure is swaged into interlocked frictional engagement with said internal thread-like structure so as securely to anchor said ferrule in place in said bore, and wherein the outer casing of said ferrule being harder than the core thereof minimizes longitudinal creep of said ferrule in said bore in said step of subjecting the interior surface of said ferrule to swaging pressure, said internal thread being adapted to receive and to engage a cooperating external thread carried upon the shank of a screw, or the like.

5. A ferrule for use in producing a strong threaded anchorage in a workpiece formed of relatively soft metal, said ferrule being adapted to be forced into a bore provided in the workpiece mentioned and then to be subjected to swaging pressure internally thereof with an extremely hard thread-swaging member so as simultaneously to swage an internal thread upon the interior surface of said ferrule and to swage an external thread-like structure upon the exterior surface of said ferrule and to compress an internal thread-like structure upon the workpiece interiorly of the bore therein, wherein the two thread-like structures mentioned are complementary and the external thread-like structure is swaged into interlocked frictional engagement with the internal thread-like structure so as securely to anchor said ferrule in place in the bore mentioned, and wherein the internal thread mentioned is adapted to receive and to engage a cooperating external thread carried upon the shank of a screw, or the like; said ferrule being formed of relatively hard metal characterized by plastic flow under swaging pressure internally thereof, said ferrule being split longitudinally and the exterior surface thereof carrying a plurality of longitudinally extending serrations therein, whereby the split in said ferrule is closed and said serrations cut into the wall of the bore mentioned when said ferrule is forced thereinto in order firmly to secure said ferrule in place in the bore, the outer casing of said ferrule being prehardened with respect to the core thereof, whereby the outer casing of said ferrule being harder than the core thereof minimizes longitudinal creep of said ferrule in the bore mentioned incident to subjecting of said ferrule to swaging pressure internally thereof, and a surface coating of cadmium carried by the outer casing of said ferrule, whereby said surface coating of cadmium carried by the outer casing of said ferrule effectively lubricates the thread-swaging member mentioned incident to subjecting therewith said ferrule to swaging pressure internally thereof.

References Cited in the file of this patent

UNITED STATES PATENTS

| | | |
|---|---|---|
| 843,650 | Wilkinson | Feb. 12, 1907 |
| 1,703,232 | Gray et al. | Feb. 26, 1929 |
| 2,577,810 | Rosan | Dec. 11, 1951 |
| 2,936,014 | Kraus et al. | May 10, 1960 |
| 3,066,557 | Stevens | Dec. 4, 1962 |